US009117312B2

(12) United States Patent
Tonnesen (10) Patent No.: US 9,117,312 B2
(45) Date of Patent: Aug. 25, 2015

(54) SYSTEM AND METHOD FOR PREVENTING PINCHES AND TANGLES IN ANIMATED CLOTH

(75) Inventor: David Tonnesen, Venice, CA (US)

(73) Assignees: SONY CORPORATION, Tokyo (JP); SONY PICTURE TECHNOLOGIES INC., Culver City, CA (US)

( * ) Notice: Subject to any disclaimer, the term of this patent is extended or adjusted under 35 U.S.C. 154(b) by 821 days.

(21) Appl. No.: 12/900,101

(22) Filed: Oct. 7, 2010

(65) Prior Publication Data

US 2011/0084970 A1     Apr. 14, 2011

Related U.S. Application Data

(60) Provisional application No. 61/249,943, filed on Oct. 8, 2009.

(51) Int. Cl.
*G06T 13/40* (2011.01)
(52) U.S. Cl.
CPC ............. *G06T 13/40* (2013.01); *G06T 2210/16* (2013.01)
(58) Field of Classification Search
CPC .................................. G06T 13/00; G06T 13/40
See application file for complete search history.

(56) References Cited

U.S. PATENT DOCUMENTS

| 6,657,629 | B2 | 12/2003 | Baraff et al. |
| 7,355,600 | B2 | 4/2008 | Baraff et al. |
| 2005/0027767 | A1* | 2/2005 | Couture-Gagnon .......... 708/300 |
| 2006/0290693 | A1* | 12/2006 | Zhou et al. .................... 345/420 |

OTHER PUBLICATIONS

Liu et al., "Collision avoidance in cloth animation", The Visual Computer, May 1996, vol. 12, No. 5, pp. 234-243.
Baraff et al., "Untangling Cloth", http://accad.osu.edu/%7Ecchriste/763/cloth/recent.htm. 2009.

* cited by examiner

*Primary Examiner* — Said Broome
(74) *Attorney, Agent, or Firm* — Mark D. Wieczorek; Mayer & Williams PC (57) ABSTRACT

Systems and methods are disclosed for altering character body animations to improve subsequent cloth animations. In particular, based on a character body animation, an extra level of processing is performed, prior to the actual cloth simulation. The extra level of processing removes potential areas of pinching or tangling in input character body simulation data, ensuring that the output of the cloth simulation will be have reduced pinches and tangles.

17 Claims, 10 Drawing Sheets

Double mesh test case

Here the original meshes are rendered transparent and the output meshes are checkerboard textured

(B) Input driven by skeleton → Output (C) Animation Start Frame | KeepAway Deformation

SAMPLING DENSITY   FIG. 10

SYSTEM AND METHOD FOR PREVENTING PINCHES AND TANGLES IN ANIMATED CLOTH

CROSS-REFERENCE TO RELATED APPLICATIONS

This application claims benefit of priority of U.S. Provisional Patent Application Ser. No. 61/249,943, filed Oct. 8, 2009, entitled "PREVENTING TANGLED CLOTH", owned by the assignee of the present invention and incorporated herein by reference in its entirety.

BACKGROUND

In CG feature film production generally, a generated character body animation receives an approval and is then sent to a cloth artist for cloth animation. The cloth artist generates an appropriate animation of cloth meshes with respect to the given character animation and the director's aesthetic vision.

Such animations sometimes exhibit a pinching problem. A pinching problem exists when two surface areas interpenetrate each other, pinching the surface between them. For cloth simulations, it is difficult for a cloth simulation engine to provide a reasonable solution. Often, the result is tangled cloth at that frame and subsequent frames.

Prior approaches to solving these pinching problems were internal to the cloth simulation engine. That is, when the cloth simulation for a character body mesh with is generated, pinching or tangling is detected and addressed during the simulation. In these approaches, pinched areas are identified, and a solution is calculated that provides reasonable cloth mesh positions for the given case. The same are then substituted for the pinched or tangled regions.

Figure 1:
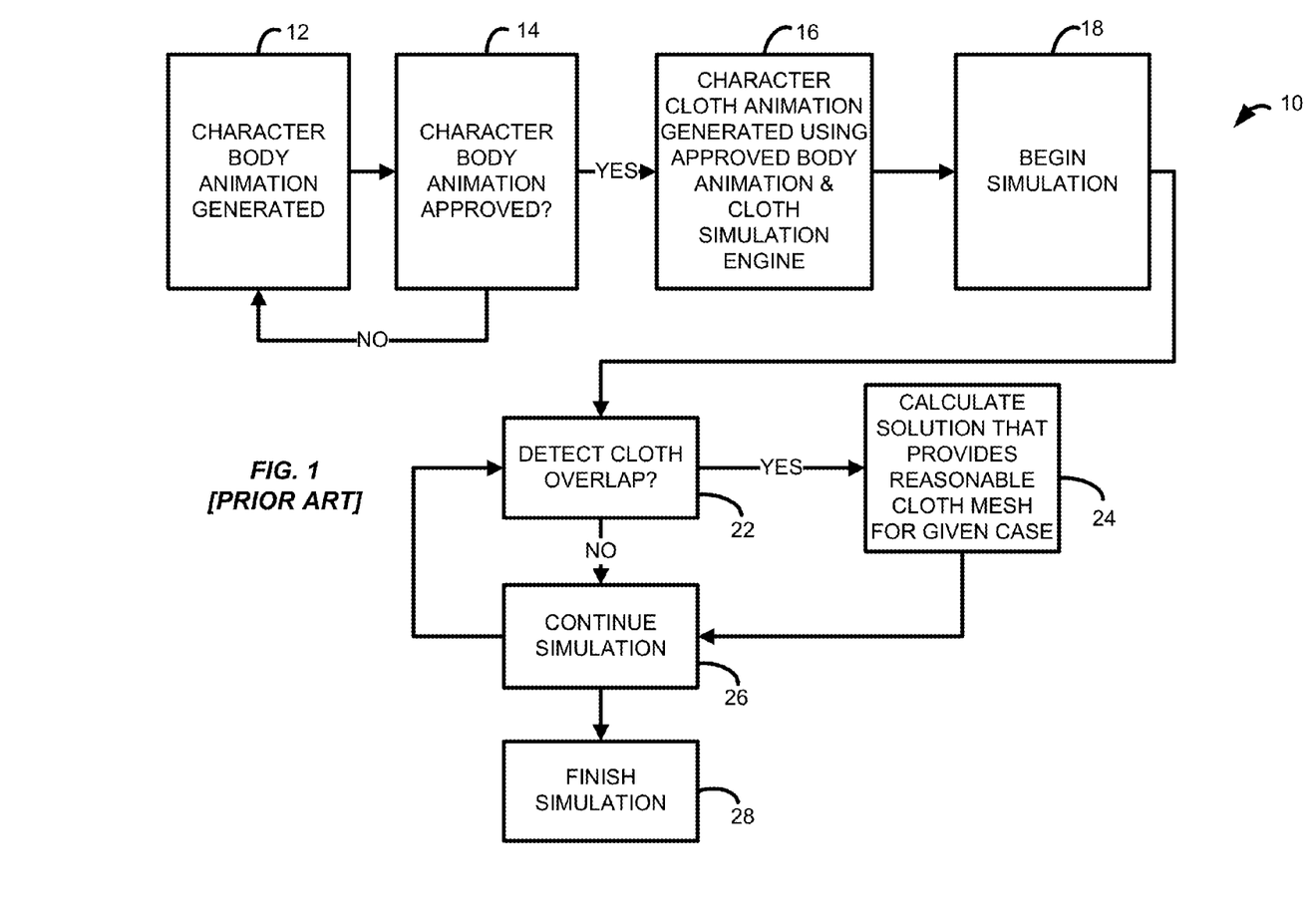
FIG. 1 is a flowchart showing a prior art way to eliminate pinching or tangling.

Referring to FIG. 1, a flow chart 10 is illustrated showing one way to eliminate pinching or tangling as described in the prior art. A first step is that a character body mesh or animation is generated (step 12). The character body animation goes through an approval step (step 14), and if approved a character cloth mesh or animation is generated using the approved character body animation (step 16). The character cloth animation is generated using a cloth simulation engine. In the character cloth animation, a simulation is begun (step 18), and during the simulation overlaps in the simulated cloth, i.e., where two pieces of cloth occupy the same location in space, are attempted to be detected (step 22). This detection may occur in a number of ways, using standard collision detection techniques. If a cloth overlap area is detected, a solution is calculated that provides for reasonable cloth mesh positions for the given case (step 24). The simulation then continues (step 26). Once the character cloth animation has been generated, the simulation finishes (step 28).

This calculating-during-simulation is slow, primarily because the calculation is complex. The input data are over-constrained, and finding a solution to match the many boundary conditions is difficult and time-consuming

SUMMARY

The disclosed systems and methods provide an improved way to perform cloth animation. In particular, the improved systems and methods perform an extra level of processing, prior to the actual cloth simulation. The extra level of processing modifies the input character body mesh, eliminating or reducing pinching problems prior to simulation, and causing the output of the cloth simulation to be reduced in pinches and tangles or even pinch- and tangle-free.

In the disclosed systems and methods, prior to cloth simulation, a character body mesh is analyzed for potential pinch or tangle regions. One or more pairs of surface regions are defined on the character body mesh along with a minimum distance value to be satisfied. The pairs of surface regions on the body mesh are checked to ensure that the minimum distance is maintained between them. These pairs of surface regions may be chosen as those particularly prone to pinching, such as arm/torso, leg/hip, or the like. The optimal minimum distance value may be determined by costume design, simulation constraints, and/or the desired visual style. Where the minimum distance is not maintained, a deformation is made of the body mesh in those regions so that the minimum distance is regained in the deformed mesh. During the cloth simulation, the deformed mesh is used instead of the original mesh.

The disclosed systems and methods may employ one or more input assumptions to ensure clean processing. The disclosed systems and methods may compute the deformation by: separating pairs of body regions that are too close; relaxing surface points back toward input positions, e.g., those originally set by the character artist in the pre-processed mesh; using a prior frame's solution as a starting point for a subsequent frame; and/or enforcing a minimum distance between body regions.

In one aspect, the invention is directed to a method of treating a character body animation to prevent potential pinches or tangles of cloth in a corresponding cloth animation. Steps of the method include analyzing a character body animation, the analyzing including calculating the distance between at least one pair of predetermined body regions; for each frame in the animation for which the predetermined body regions are less than a predetermined minimum distance apart, deforming at least one of the predetermined body regions such that the predetermined body regions are greater than or equal to the predetermined minimum distance apart, to form a deformed mesh.

Implementations of the invention may include one or more of the following. The method may further include generating a cloth simulation based on the deformed mesh. The predetermined minimum distance may vary with the pairs of predetermined body regions, and may be in a range of about 0.1 cm to 4 cm. A plurality of pairs of predetermined body regions may be defined, e.g., those chosen from the group consisting of: arm and torso, right and left leg, head and shoulder, leg and hip, hand and body, and band of elbow or knee. The calculating a distance may include calculating a distance between each of a plurality of mesh faces on one predetermined body region and each of a plurality of mesh faces on the other predetermined body region. The deforming may include moving one or more faces away from each other such that the distance between the faces equals or exceeds the predetermined minimum distance. The analyzing may include using a frame of one deformed mesh as a starting point for a generation of a succeeding frame. Each of the pair of predetermined body regions may be a respective set of mesh faces. A first frame analyzed in the analyzing step may have no pairs of predetermined body regions that are separated by less than the predetermined minimum distance. The pair of predetermined body regions may have no points in common. The deforming may include moving one or more faces away from each other such that the cumulative distance moved by all of the faces is minimized. The deforming may include moving one or more faces a distance based on a weighted average. A smoothing step may be performed on the deformed mesh.

In another aspect, the invention is directed to a computer-readable medium, including instructions for causing a computing system to perform the above method.

In another aspect, the invention is directed to a computing system, including: memory bearing computer-readable instructions capable of instantiating a user interface for creating and manipulating a character body animation; memory bearing computer-readable instructions capable of analyzing the character body animation for potential pinch or tangle regions; and memory bearing computer-readable instructions capable of deforming the character body animation at one or more locations of potential pinch or tangled regions.

Implementations of the invention may include one or more of the following. The system may further include memory bearing computer readable instructions capable of creating a character cloth animation based on the deformed character body animation.

In another aspect, the invention is directed to a computing system, including: an input module, the input module for creating or receiving a character body animation, or both; a pinch or tangled detection module, the detection module for analyzing the character body animation and determining if any pairs of predetermined body regions in the character body animation may result in pinching or tangling; and a character body animation deformation module for creating a deformed character body mesh in the areas that may result in pinching or tangling, the deformed character body mesh having less areas that may result in pinching or tangling than in the input character body animation.

Implementations of the invention may include one or more of the following. The system may further include a cloth simulation module, the cloth simulation module for receiving the deformed mesh and for generating a non-pinched and non-tangled cloth mesh encompassing at least a portion of the deformed mesh. The detection module may be configured to determine if any pairs of predetermined body regions may result in pinching or tangling by calculating one or more distances between the pairs of predetermined body regions and if any of the one or more distances are less than a predetermined minimum distance, then the detection module may determine that the pair of predetermined body regions may result in pinching or tangling.

In another aspect, the invention is directed to a method of treating a character body animation to prevent potential pinches or tangles of cloth in a corresponding cloth animation, including: analyzing a character body animation, the analyzing including calculating the distance between each pair of points or faces in a mesh forming the character body animation; for each frame in the animation for which the pair are less than a predetermined minimum distance apart, deforming at least one of the points or faces such that the predetermined body regions are greater than or equal to the predetermined minimum distance apart, to form a deformed mesh.

Advantages may include one or more of the following. The systems and methods "fit" better into the animation workflow than its predecessors. Typically a character animation is generated by one artist, approved, and then another artist generates the cloth animation, the cloth animator having to fit the cloth into the approved geometry. In the disclosed systems and methods, pinches and tangles are addressed and eliminated prior to the cloth simulation, so the same never arise as a problem.

The systems and methods are formulated as a general case mesh problem enforcing an invariant minimum distance, and are applicable to a wide variety of geometric problems. Accordingly, the technology is not limited to the specific examples or implementations disclosed. The subsequently-solved cloth simulations are cleaner, less-tangled, and execute faster than without pre-processing. The disclosed systems and methods may be employed with any body or cloth simulation engine. The resulting character body animation needs to be computed only once for repeated simulations. Initial attempts have shown that such pre-processing results in cloth simulations executing two to four times faster on average, while generating cleaner results and fewer tangles. The systems and methods are applicable to all poly meshes, including meshes with quad faces or segments and meshes with triangular faces or segments, or both, and thus are capable of solving a wide range of production problems.

Other advantages will be apparent from the following description, including the figures and claims.

BRIEF DESCRIPTION OF THE DRAWINGS

Like reference numerals indicate like elements in the drawings. Elements are not drawn to scale unless otherwise indicated.

DETAILED DESCRIPTION

Systems and methods are disclosed to prevent pinching or tangling during a cloth simulation for a character body animation. In one implementation, a minimum distance criteria is enforced, over time, between two surface body regions. One optimal minimum distance value may be, e.g., 2 cm, although this value may vary greatly. In the implementation, animated poly meshes may be employed having constant topology. Each of the two surface regions may be a set of mesh faces, and the vertices in one face may be unique from the vertices in the other set. A clean non-intersecting frame may be used as a starting point for the calculations.

Figure 2:
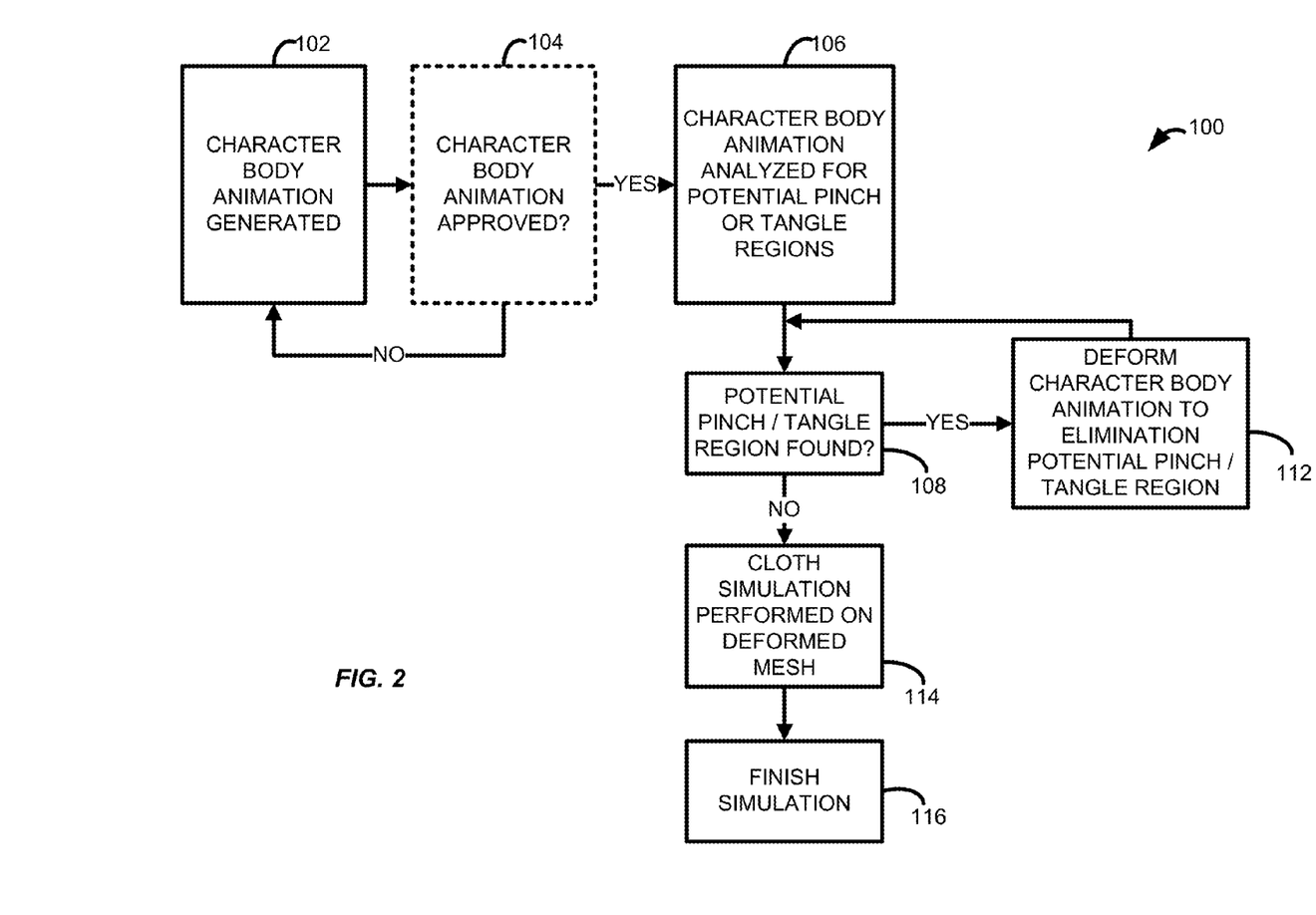
FIG. 2 is a flowchart illustrating a first implementation of a method of the invention.

Referring to FIG. 2, a flowchart 100 is shown illustrating a first implementation of the system and method. A first step in the flowchart 100 is that a character body animation is generated (step 102). The character body animation may be generated in a number of ways, including the use of skeletal animation followed by a skinning process. Other techniques may also be employed. The character body animation may then undergo an approval step (step 104). If not approved, the character body animation may be revised. Once approved, the character body animation may be analyzed for potential pinch or tangle regions (step 106). If a potential pinch or tangle region is found (step 108), e.g., a pair of predetermined body regions that may result in pinching or tangling, then the character body animation may be deformed in order to eliminate the potential pinch or tangle region (step 112). It is noted that the potential pinch or tangle region is "potential" in the sense that the same may cause pinching or tangling in a subsequent cloth simulation. The potential pinch or tangle region may itself be unpinched or pinched, or tangled or untangled.

This detection and potential deformation are repeated for the entire character body animation. The deformed mesh is saved, and a cloth simulation may be generated on the deformed mesh (step 114). The simulation may then finish when concluded (step 116).

Figure 3:
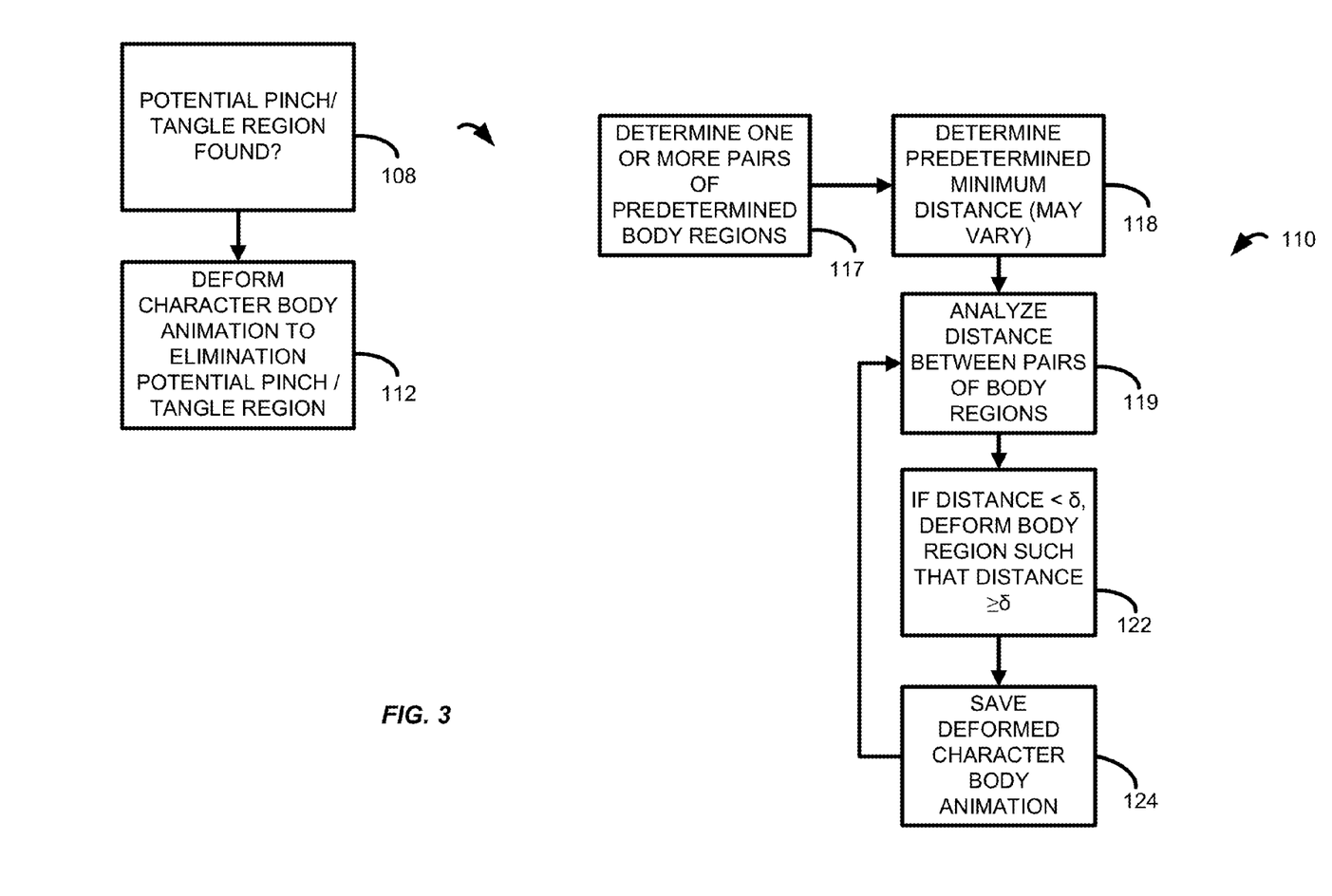
FIG. 3 is a flowchart illustrating details of one embodiment of certain steps from the flowchart of FIG. 2.

FIG. 3 illustrates a flow chart 110 that may be employed to implement steps 108 and 112 of FIG. 2. Two preliminary steps are also shown.

In particular, a first step is to determine or define one or more pairs of surface regions (step 117). This step may be performed on a number of bases, including per character, per scene, per movie, per series, or the like. A default set of pairs may also be employed for known pinching regions. Known pinching regions may include, e.g., the upper arm and torso, the upper right and left leg regions, the head and either shoulder, leg and hip regions, the hands and regions of the body accessible to the hand, the band of an elbow or knee, or the like. However, it will be noted that in any given project a number of other areas may also be susceptible to such pinching or tangling, and an animator may choose such areas arbitrarily. If processing power allows, all body regions may be considered.

A next step is to determine or define a predetermined minimum distance (step 118). The predetermined minimum distance may be fixed or may vary with the predetermined body regions. For example, the distance may vary between the arm/torso pair of regions and the leg/hip pair. In some cases, it may even vary within one region. In one implementation, for animated figures that are intended to depict life-size characters, a predetermined minimum distance may vary from about 1 mm to 4 cm, e.g., 2 cm.

The above preliminary steps may occur prior to the preprocessing, or pinch/tangle elimination step, and in some cases may occur long prior to the same. The following steps, on the other hand, may be performed in a given implementation when steps 108 and 112 are performed.

A distance between pairs of predetermined body regions may be analyzed (step 119). This step can be performed in a number of ways. For example, each predetermined body region may be broken up into one or more "mesh faces" or "mesh segments" or just "segments". For example, several tens of mesh faces may constitute a body region although the number may generally depend on the size of each mesh face, the size of the body region, and the arrangement of mesh faces within the body region. Where body regions are composed of mesh faces, step 119 is performed as between pairs of mesh faces, one on each body region or between points within each mesh face. It will be understood that other distance calculations may also be employed.

If the distance between one or more pairs of predetermined body regions or mesh faces is less than δ, then the character body animation is deformed such that the distance is greater than or equal to δ. This deformation may be performed in a number of ways. For example, one predetermined body region may be set such that it always undergoes deformation while the other does not. Alternatively, both predetermined body regions may be deformed. Where both body regions undergo deformation, the percentage or amount of deformation each undergoes may be set or may be defined by the animator for any given scene.

In one embodiment, for each pair of sample points, one from each of two regions, the distance between the points is computed and points are displaced if necessary. For two points, Pi and Pj, Pj is tested as to whether the same is inside a sphere of radius 'r' centered at Pi. Pj is displaced toward the outside of the sphere, along the direction vector connecting Pi to Pj. Pi is displaced in the opposite direction. The radius 'r' value is set to the separation distance.

The deformation can occur in other ways as well. For example, the deformation may occur so as to minimize the overall cumulative displacement. The deformation calculation may include calculating an average displacement and using this value as a basis for other displacements, or alternatively by employing a weighted average. An integration may be performed over the weighted average as a relaxation step to create a more homogeneous, e.g., uniform or smoothed, mesh. This relaxation step is an iterative process with the number of iterations specified by the animator. A final step is that the deformed character body animation or mesh is saved (step 124), and the deformed mesh may then be the subject of the cloth simulation of step 114 of FIG. 2.

Figure 4:
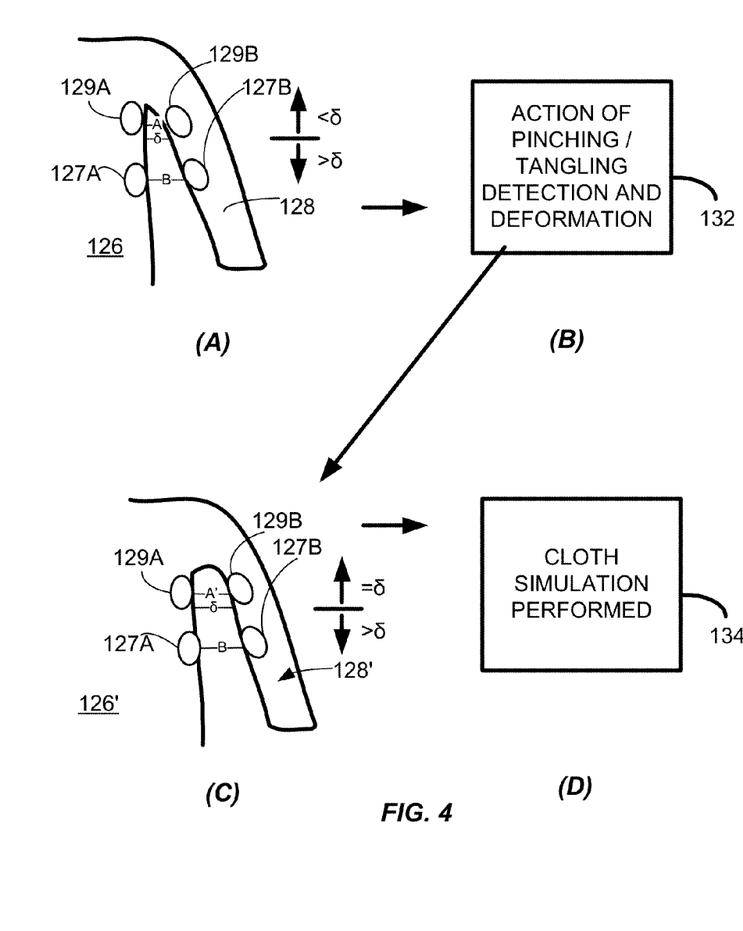
FIGS. 4(A)-4(D) illustrate the action of the disclosed systems and methods on a schematic character body mesh.

FIGS. 4(A)-4(D) illustrate a pinched body animation geometry, the action of a deformation module, a deformed character body animation, and a cloth simulation step, respectively. In particular, the FIG. 4(A) illustrates a torso region 126 and an upper arm region 128. A set of predetermined body region mesh faces 127A and 129A are illustrated on the torso, along with a set of mesh faces 127B and 129B on the upper arm. The mesh faces 129A and 129B are a distance A apart, the distance A less than a predetermined minimum distance delta. As may be seen, other mesh faces 127A and 127B are a distance B apart, the distance B greater than the predetermined minimum distance delta.

The character body animation of FIG. 4(A) may undergo the action 132 of pinch or tangle detection and deformation (FIG. 4(B)) to result in the potentially deformed character body animation of FIG. 4(C), and in particular the deformed torso 126' and the deformed upper arm 128'. In FIG. 4(C), the predetermined body regions 129A and 129B have been deformed such that the distance between them is now A', which is greater than or equal to Delta. FIG. 4(D) illustrates that a cloth simulation step 134 may be performed using the deformed character body animation as an input mesh.

Figure 5:
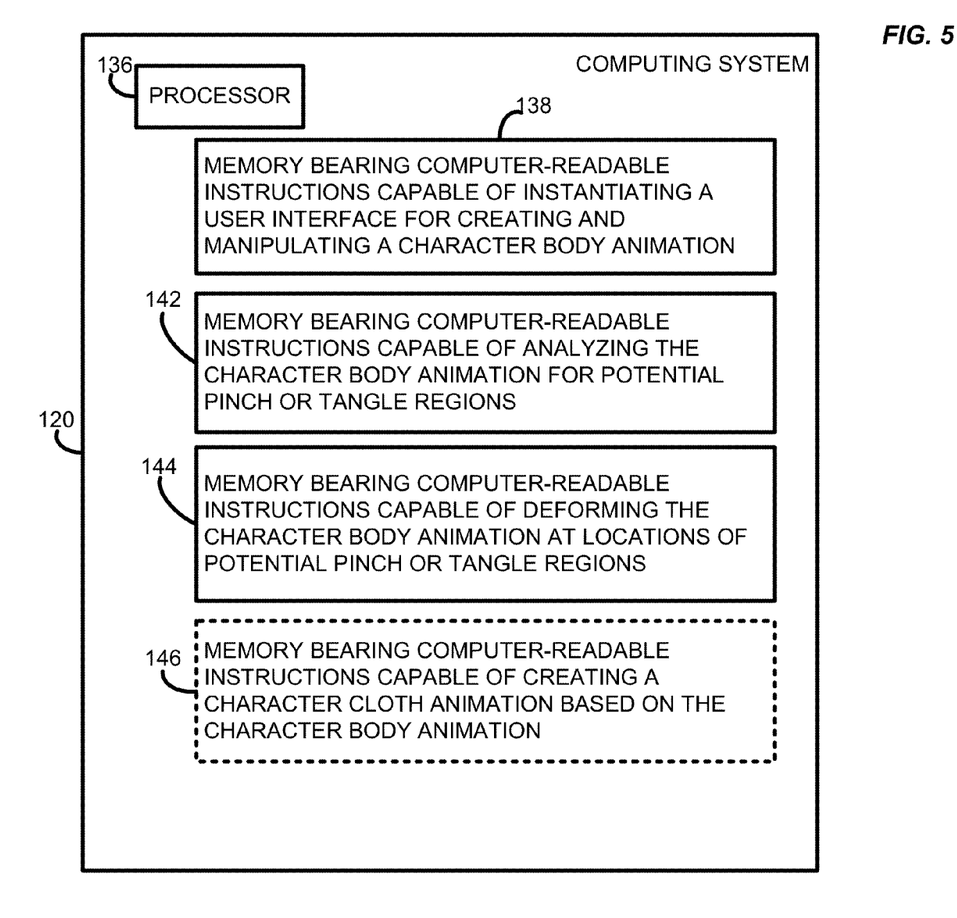
FIG. 5 illustrates a first exemplary structure of a computing device that may be employed to implement one or more of the features described herein.

FIG. 5 illustrates a first exemplary structure of a computing system 120 that may be employed to implement one or more of the features described herein. The computing system 120 may correspond to, e.g., an animation workstation. The computing system 120 includes a processor 136 and also includes memory 138 bearing computer-readable instructions capable of instantiating a user interface for creating and manipulating a character body animation. Of course, it will be understood that this will encompass situations where the creating and manipulating are performed on a number of different computing systems. The computing system 120 further includes memory 142 bearing computer-readable instructions capable of analyzing the character body animation for potential pinch or tangle regions. These instructions would carry out tasks relating to determining if two body regions were within a predetermined minimum distance apart from each other. The computing system 120 further includes memory 144 bearing computer-readable instructions capable of deforming the character body animation at locations of potential pinch or tangle regions. The way in which these instructions may perform the deformation may be as disclosed above. The computing system 120 may also include memory 146 bearing computer-readable instructions capable of creating a character cloth animation based on the character body animation, although commonly another computing system may perform this function. Other memories may be employed to bear other pertinent information, instructions, and data.

Figure 6:
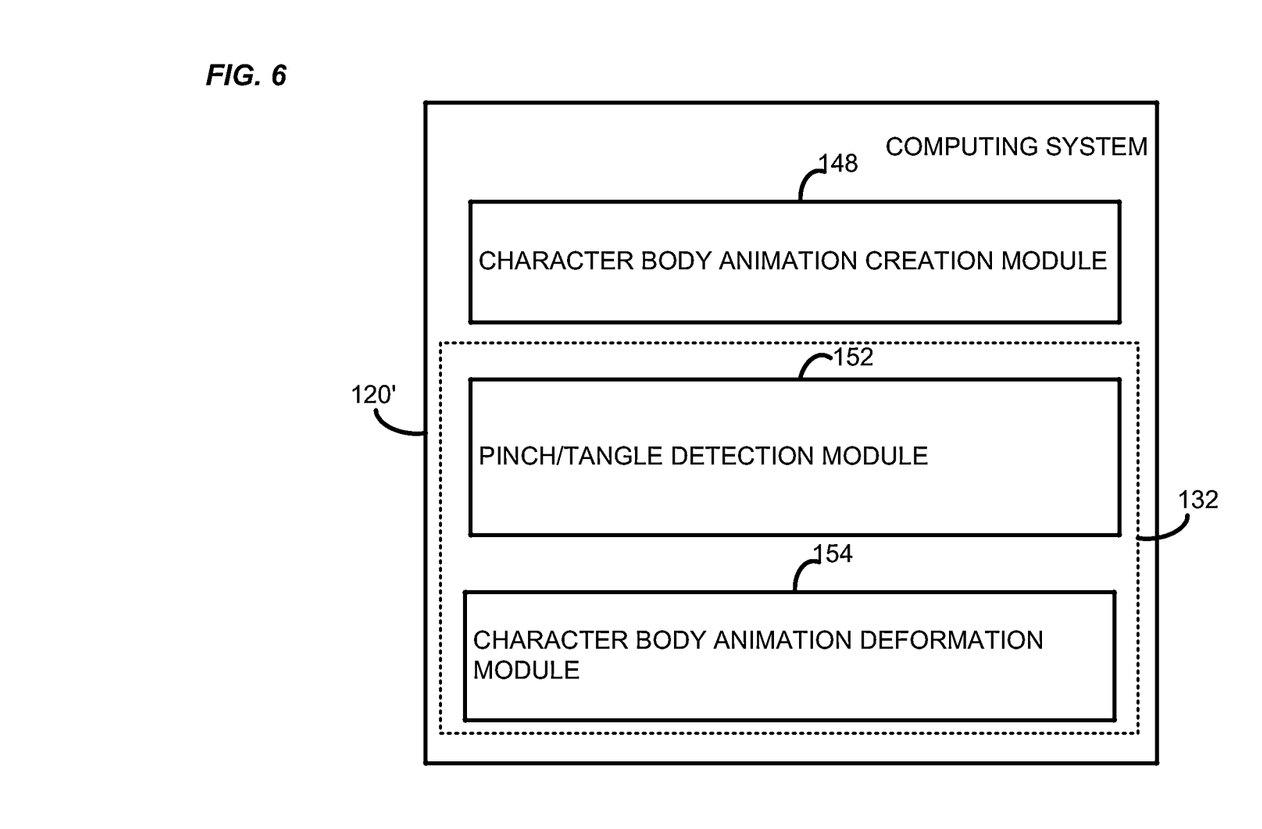
FIG. 6 illustrates a second exemplary structure of a computing device that may be employed to implement one or more of the features described herein.

FIG. 6 illustrates a second exemplary structure of a computing system 120' that may be employed to implement one or more of the features described herein. The computing system 120' includes a character body animation module 148 for creating or receiving a character body animation. In some implementations, the module 148 may be employed to generate the character body animation, e.g., a skeletal animation and skin. In another implementation, the module 148 may receive a character body animation and make the same available to the modules below. The computing system 120' further includes a pinch or tangle detection module 152 for detecting areas of potential pinches or tangles as between pairs of predetermined body regions or alternatively between mesh faces of the same. The computing system 120' further includes a character body animation deformation module 154 for deforming the character body animation as described above. The pinch or tangle detection module 152 and the character body animation deformation module 154 together provide the action 132 described in FIG. 4(B).

Variations of the computing system 120' will be apparent given this teaching. For example, not all of the modules need be located on a single system. In some cases, most or all of the modules may be on separate systems.

EXAMPLE

In one specific implementation, the system and method were implemented as a plug-in to the Maya® software application available from Autodesk® Inc. of San Rafael, Calif., USA. The following example describes the implementation, but it should be noted that the system and method are not limited to such an implementation, nor are the functional constraints and boundary conditions disclosed necessary in all implementations.

The system and method were implemented as a node within Maya®, the node termed spKeepAway. The goal of this "solver" was to deform polymeshes, so that two sets of mesh faces were never closer than a specified distance. In particular, the plug-in kept faces apart by a given distance, provided coherence in space and time, desiredly did not adjust or deform faces that were already far enough apart, and returned faces to their original shapes and/or positions when deformation was no longer required by the distance requirement. The plug-in met the stated goals by approximating, for each mesh, a continuous surface by a set of sample points. The solution from a previous frame was employed as a starting point for the next frame. The distance between sample points was tested, one sample from each of the two face sets. In other implementations, more samples may be tested. Mesh vertices were then iteratively displaced until the distance criteria were satisfied. The vertices were then moved, from the positions of the previous solution, back toward the input position, i.e., that given by the original body mesh, without exceeding the minimum distance. A smoothing process was included to smooth areas of the mesh that were deformed. In one implementation, the smoothing was confined to areas deformed, and up to a specified number of edges away. Upon the determination of a solution, the results were cached. The results could then be viewed by reviewing the cache.

In this implementation, certain assumptions were made, which may differ from case to case. The meshes were composed of quads and triangular faces. The vertices and faces in one set were unique from the vertices and faces in the other set. Finally, a clean non-intersecting frame was used as a starting frame. Various tools may be employed to assist the artist, including a custom shelf for the node, MEL code for user scripting, which is called by the shelf buttons, and a GUI for generating setups.

Figure 7:
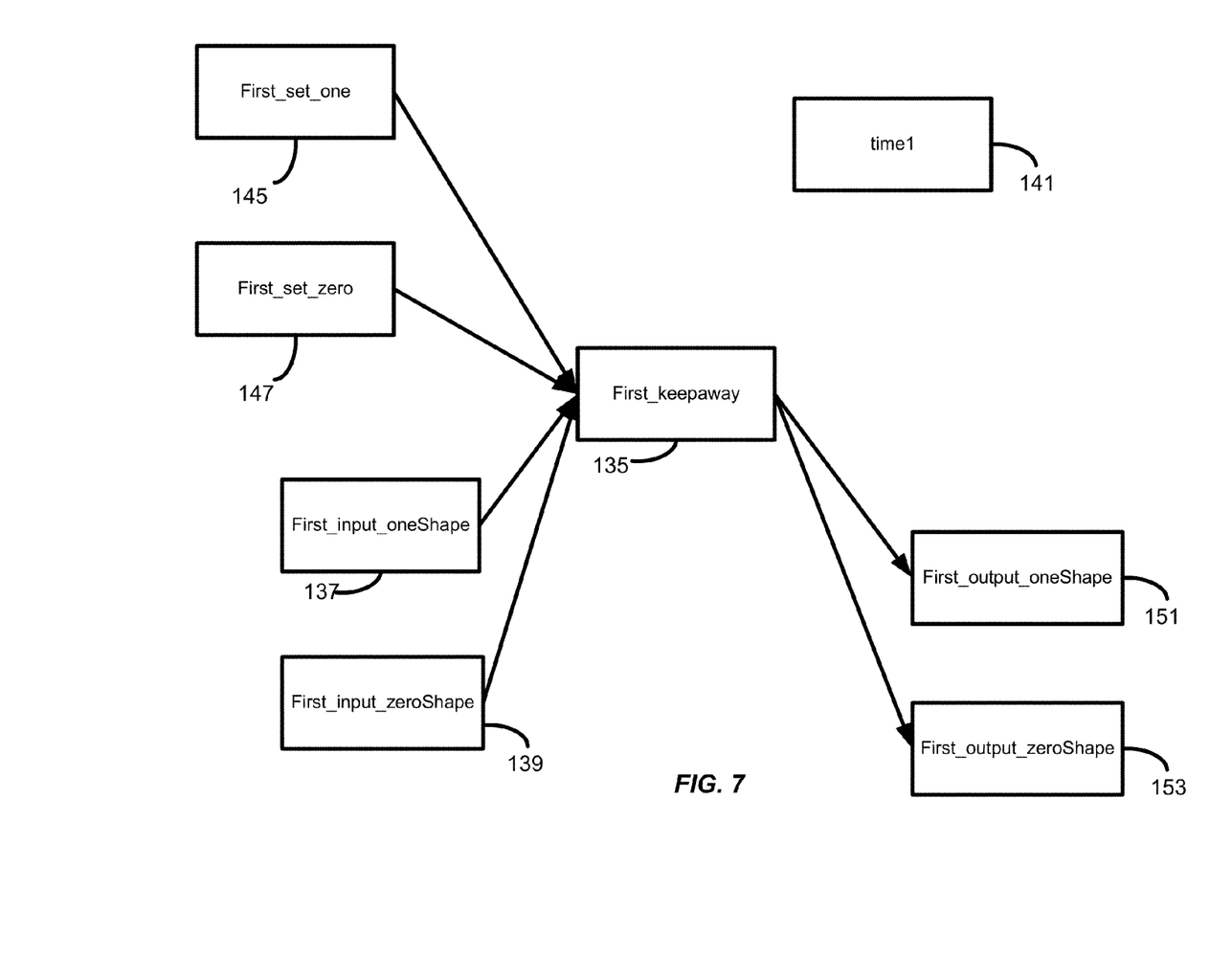
FIG. 7 illustrates data flow in one implementation of the system and method.
Figure 8:
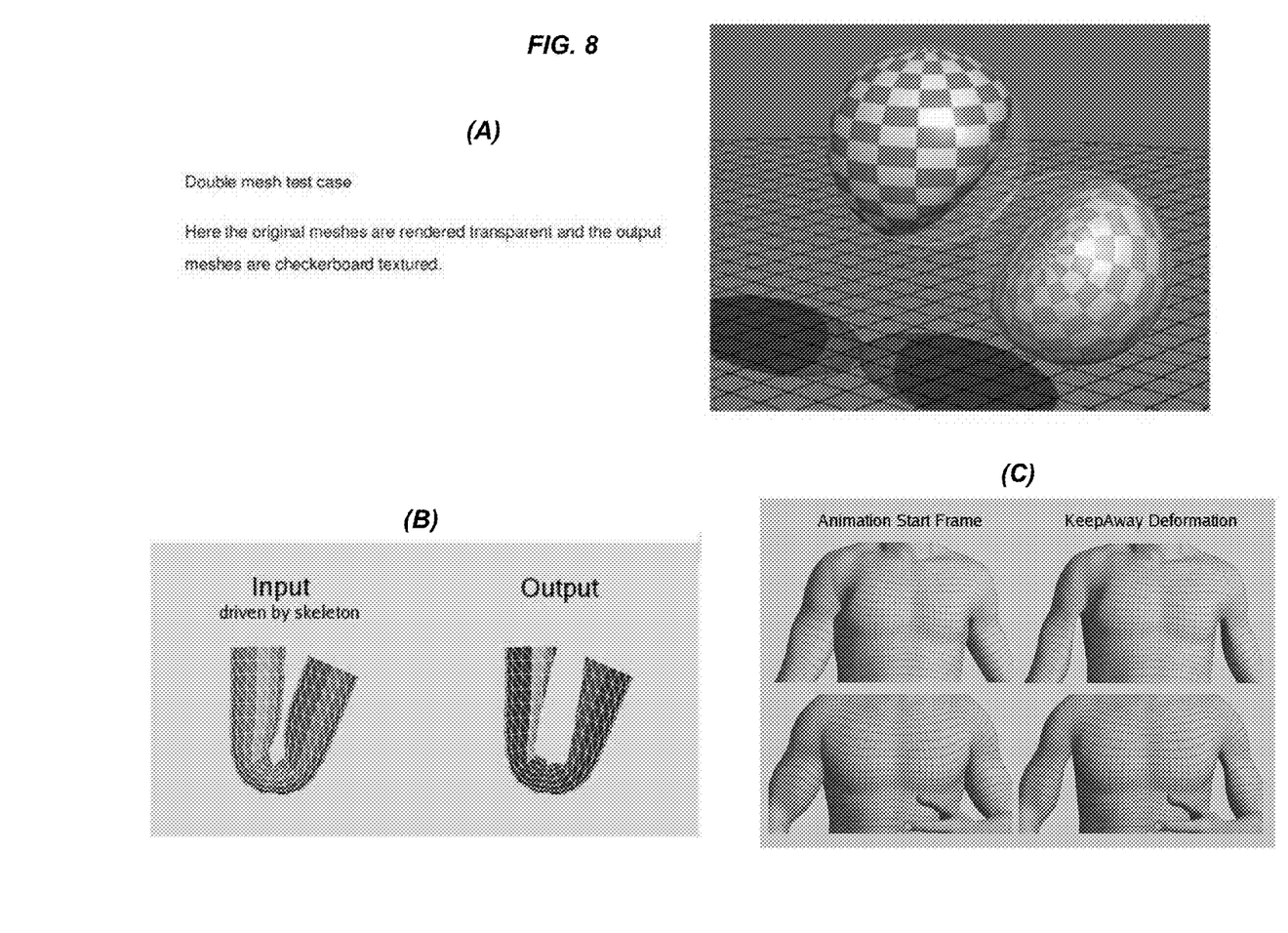
FIG. 8 illustrates the action of an exemplary implementation of the disclosed system and method.

Referring to FIG. 7, a hypergraph view is illustrated. First input shapes 137 and 139, e.g., quads and/or triangles, with vertex sets 145 and 147, are inputs to the KeepAway node 135, resulting in output shapes 151 and 153, respectively. In some implementations, just one mesh may be input, e.g., where the mesh itself encounters pinching or tangling. The output meshes correspond to the input meshes, and their vertex positions include the separation deformation as well as the post-smoothing results. The two Maya sets may be part of a Maya partition, ensuring that the faces in the two sets are unique, that is, a face does not belong to two sets at the same time. The KeepAway node 135 is connected to the Time node 141, so that the former knows when to update the separation deformations, i.e., the same updates whenever the time value changes. The post-smoothing also generally updates when time changes, but also whenever one of the smoothing-related attributes change. In this way, smoothing can be tuned by the user without having to recompute the separation deformation. In some implementations, it may be desirable to chain several KeepAway solvers together, connecting an output mesh of one solver to the input mesh of the next. The results of one implementation of the KeepAway node are indicated in FIGS. 8(A)-8(C).

The attributes of the spKeepAway node are now described. When an spKeepAway node is created, the attributes may be set to standard default values, such as those that have been found to be reasonable for a variety of cases. In some implementations, by default, the "smoothing" step may be turned off. Later, smoothing may be enabled again after an initial solution is reviewed by the user. When smoothing is enabled, its performance may be post-process, on a per-frame basis, and may be applied following the distance-based deformation. In this way, the user can interactively tune the appropriate attributes.

Figures 9, 10, 11:
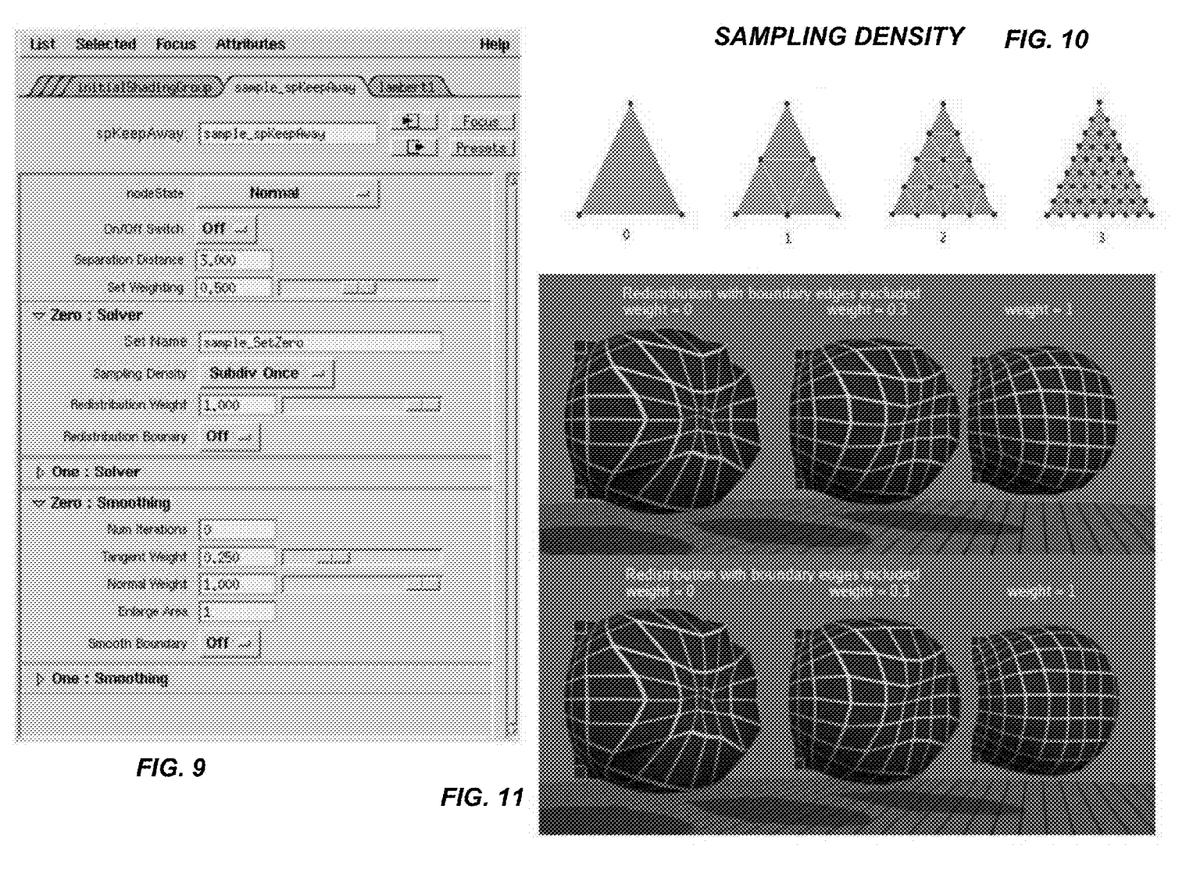
FIG. 9 is a screenshot illustrating exemplary default values for the attributes for an spKeepAway node.
FIG. 10 illustrates various sampling densities on a triangular section.
FIG. 11 illustrates the effect of the redistribution weight and redistribute boundary attributes.

Sample MEL code which may be employed for setting the node to the default attribute values may be, e.g.:

|spincludeAlways "<mel/tools/spKeepAway/spKeep-Away.mel>"; spka_set_defaul_attribute_values {"sample_spKeepAway"};

FIG. 9 is a screenshot showing exemplary default values for the spKeepAway node.

Distance-solving attributes are described below. In this implementation, there are two attributes to enable and disable the solver from performing computations: nodeState and on Switch. Solving occurs when the nodeState is set to Normal and the on Switch is set to "On". When the nodeState is set to "Has No Effect", the output mesh is a copy of the input mesh. Similarly, when the on Switch is set to "Off", the output mesh is a copy of the input mesh. If the user wishes to selectively avoid solving, the nodeState is keyframed. The on Switch automatically turns to "On" when solving using the standard MEL scripts and shelf buttons. The on Switch attribute may be, but is not required to be, saved in the scene file.

The separation distance represents the minimum distance between the two sets of faces. This number is generally positive and nonzero, and may employ standard Maya units.

There may be a direct relationship between the separation distance and the sampling density. As the separation distance decreases, the sampling density may increase (the latter discussed in greater detail below). For larger quad and triangle faces, a higher sampling density may be employed. For example, in some applications, a separation distance of 3 units may be employed. For applications having tighter clothing, 1.5 to 2 units may be employed. In some cases, the system and method may analyze any cloth constraints, pins, collision offset values, and so on, that keep the cloth a fixed distance away from the body. If these values are large, the separation distance may need to be increased to create the necessary space required by the cloth set up.

The "Set Weighting" attribute allows the user to vary the amount of deformation applied to each of the two sets of faces. The set weighting value can vary between zero and one. A value of 0.5 means to apply half of the deformation to faces of "Set Zero" and the other half of the deformation to those in "Set One". A value of 0.0 means to apply all of the deformation to "Set Zero". A value of 1.0 means to apply all of the deformation to "Set One". In some cases, especially for solving body regions including arms and torsos, many artists preferred the arm to deform more than the torso, e.g., 80% arm, 20% torso.

The various Set Solver attributes are described below. The "Set Name" represent the names of the Maya sets that hold the quad or triangle faces that are analyzed and that are deformed accordingly. When a user creates an spKeepAway node, two Maya sets are created as elements of a partition. The partition forces the requirement that the two sets do not overlap. The sets are also restricted to holding only faces, e.g., by employing the facets option. If the user changes the set contents during a Maya session, the spKeepAway node will update the output meshes accordingly.

Another attribute, as noted above, is sampling density. Ideally, the distance between each triangle or quad in set zero and those in set one would be calculated and compared to the minimum distance. The faces would then be moved accordingly. However, such computations may be time-consuming, so in some cases a continuous surface is approximated with point samples. Of course, vertex and edge samples may be shared between adjacent faces, thus avoiding duplicate computations. In many cases, subdividing each triangle or quad face one time provides a reasonable starting value. Exemplary sampling density depictions are illustrated in FIG. 10.

Other attributes pertain to a redistribution weight and a boundary redistribution. The redistribution algorithm may only move the vertices in their respective tangent planes. In some implementations, a goal is to obtain a distribution of the vertices that is similar to that of the corresponding input mesh. For example, the redistribution algorithm may attempt to maintain edge lengths on the output meshes that are proportionally similar to the edge lengths on the animated input meshes. When the meshes deform, the vertex positions change. If the deformation is large, vertices may cross over nearby edges and faces. Likewise, triangles or quads may stretch enough that a finer sampling of the surface is required. Consequently, a redistribution algorithm may be incorporated into the solver to allow for such cases. The redistribution weight attribute scales the amount this algorithm affects the results. It may do so by assigning each set of faces with its own weight value. For example, the valid range may be between zero and one, and a default value may be 1.0. Including boundary edges, i.e., those edges with only one adjacent face, results in a redistribution where these edges more closely follow their neighboring vertices. This attribute may be a simple toggle switch, and the default may be set to "off".

In some implementations, it may be useful to maintain the redistribution weight at 1.0 and to set the boundary redistribution as "off". The redistribution weight may be lowered, especially when two surfaces are sliding against each other, and when the mesh is collapsing on itself.

It is noted in this regard that the above presents strictly geometric techniques. In some implementations, the solver may be written using physics models, e.g., in which case the redistribution may be enforced using springs with rest lengths defined by the lengths of the edges input into the solver. Because a spring energy is a function of the squared displacement magnitude from the rest length, a spring encourages adjacent connected vertices to maintain their original relative spacing. It is noted, however, that by employing a strictly geometric algorithm, the oscillation and numerical instabilities common to energy-based approaches may be reduced or avoided. Examples of the effects of the redistribution algorithm and boundary redistribution are illustrated in FIG. 11.

Certain other attributes in the implementation correspond to smoothing, and these attributes are discussed in greater detail below. The smoothing algorithm may be executed after the separation distance has been solved for, and in that sense, is a post process on the mesh. The displacement of each vertex due to smoothing may be split into a normal component and a tangent plane component. The normal direction, for a vertex, is computed as an average of the adjacent triangles or quad normals. The tangent plane is then the plane perpendicular to the vertex normal. Because the smoothing is computed after the separation distance is solved for, the user may stop the solver at a given frame, and interactively adjust the smoothing attributes, and generally immediately view the results.

Another attribute is the number of iterations, which corresponds to how many smoothing iterations are computed. When set to zero, any other smoothing values are irrelevant. In some implementations, the value of this attribute may range between zero and three.

Another attribute is the normal weight, and its value can in some implementations range from 0 to 1. When set to 0, there may be no displacement in the direction of the vertex normal. When set to 1, the entire normal component of the smoothing displacement vector is employed. In some implementations, a value of 1.0 may be useful.

A related attribute is the tangent weight, and its value can also range in some implementations from 0 to 1. When set to zero, there is no displacement in the vertex's tangent plane. When set to one, the entire tangent plane component of the smoothing displacement vector is employed. It has been found in some implementations that a value of ¼ provides a suitable reduction of distortion in a quad mesh pattern.

Another attribute is the "enlarge area" attribute, which allows the user to control how large an area is smoothed. When set to zero, only vertices that have been displaced from their input positions are smoothed. When set to one, the region to smooth is increased by one edge length in all directions. When set to N, the region to smooth is increased by N edge lengths. The amount of smoothing may decrease the farther away the analysis extends from the original displaced vertices. In this regard, in some implementations, special attention may be paid by the user to areas with significantly differently-sized edges, such as an area extending from the armpits, with short edge lengths, to the breast of a character, which may have long edge lengths. It is noted that in some implementations, especially useful values of this attribute range from 0 to 2. Instead of using a measure of a number of edges, geometric distances may be employed instead.

Another attribute is the "smooth boundary" attribute. When set to "off", vertices that are at a mesh boundary are not smoothed. When set to "on", those same vertices are included in the smoothing computation.

Other attributes of the spKeepAway node may include input mesh zero and input mesh one. When the user creates an spKeepAway node, the meshes corresponding to the sets are attached to the spKeepAway node as inputs. One mesh is connected to the "inputMeshZero" attribute, and the other mesh, if any, is connected to the "inputMeshOne" attribute. In the same way, when one creates a new spKeepAway node, new meshes are created (Output Mesh Zero and Output Mesh One) and connected to the output attributes. The results of the solver are reflected in these output meshes. The output mesh attributes correspond to the similarly named input mesh attributes.

Another attribute is the time attribute, which is connected to the global time node. In particular, it is noted that spKeepAway works as a simulation software, and thus it is required to simulate stepwise, one frame at a time, using the results of the previous frame as the initial condition for the next frame. The time attribute is employed to trigger the computation for the current frame, i.e., the current time. It may also be used to enforce that frames are not skipped. Another attribute is ".message", which is a standard Maya attribute. The Keep-Away node's ".message" attribute is connected to the two sets' ".usedBy" attributes, so that the software application is aware of their relation.

In another implementation, the system and method may be employed on cloth meshes after simulation by a cloth engine. In particular, it is common for a cloth artist to simulate the cloth and then to modify the cloth results to meet the vision of a director. In that case, however, the modifications may result in significant penetrations between the cloth and the body geometry. A cloth artist typically removes such penetrations manually, but the same is a tedious and time-consuming process. In this implementation, the system and method may be employed directly on the cloth mesh after simulation, in which case one set of mesh faces corresponds to the body geometry and the other set of mesh faces corresponds to the cloth geometry. Application of the system and method then acts to keep the cloth from penetrating into the body geometry.

One implementation includes one or more programmable processors and corresponding computer system components to store and execute computer instructions, such as to provide an animation workstation or the like. For example, referring to FIG. 12, a representation is shown of an exemplary computing system 120 or 120' (here referred to just as 120). The system 120 includes a memory 174, which may include computer-readable media 175 such as memories 138, 142, 144, and 146. The system 120 may also include a storage area 172, which may include a computer-readable medium 173, a media device 158 for receiving a computer-readable medium 159 such as BD or DVD 162, a user interface 164, an input/output (I/O) interface 166, and a network interface 168 for connection to online resources. These components are interconnected by a common bus 170. Alternatively, different connection configurations can be used, such as a star pattern with the controller at the center.

Figure 12:
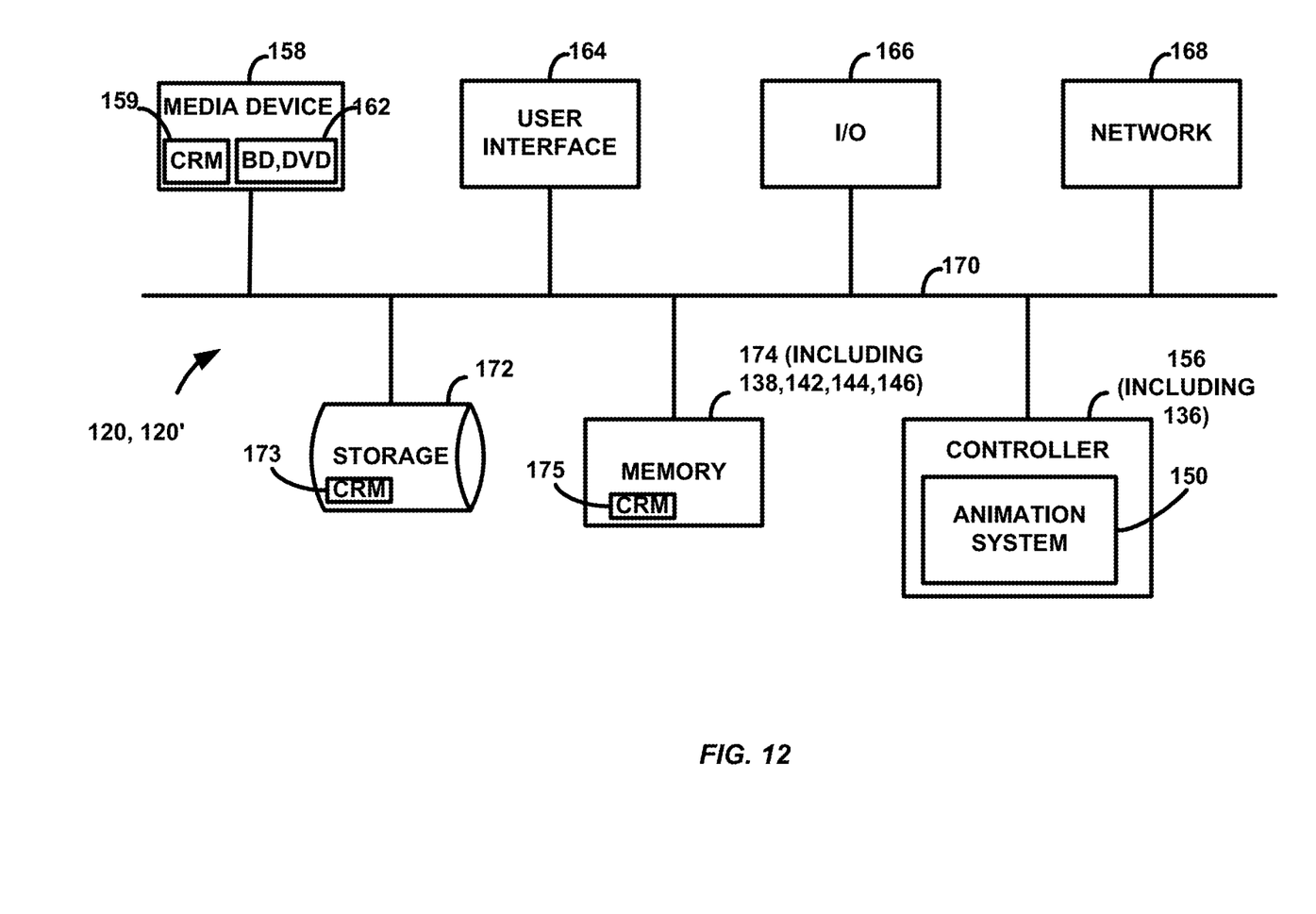
FIG. 12 illustrates a third exemplary structure of a computing device that may be employed to implement one or more of the features described herein.

A controller 156, which includes the processor 136 (FIG. 5), controls the operation of the system 120 and its components. The controller 156 loads instructions from the memory 174 or an embedded controller memory (not shown) and executes these instructions to control the system. In its execution, the controller 156 may provide the system for preventing tangles or pinches in a character body animation. Alternatively, this service can be implemented as separate components in the system 120.

The memory 174 stores data temporarily for use by the other components of the system 120, such as for storing the body animation and the pinch- and tangle-free output mesh during processing. In one implementation, memory 174 is implemented as RAM. In some implementations, memory 174 also includes long-term or permanent memory, such as flash memory and/or ROM.

The storage area 172 stores data temporarily or long term for use by other components of the system 120, such as for storing data used by the system for running the pre-processing application. In one implementation, storage 172 is a hard disc drive. In another, storage 172 is a solid state drive or comprises flash memory or the like. Other storage devices will also be understood.

The media device 158 receives removable media and reads and/or writes data to the inserted media. In one implementation, the media device 158 is an optical disc drive or disc burner 162 such as a Blu-ray® drive.

The user interface 164 includes components for accepting user input from the user of the system 120 and for presenting information to the user. In one implementation, the user interface 164 includes a keyboard, a mouse, audio speakers, and a display.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes an interface for wireless communication with external devices.

The network interface 168 includes a wired and/or wireless network connection, such as an RJ-45, or WiFi interface (802.11), or an Ethernet connection. Numerous other types of network connections will be understood to be possible, including WiMax, 3G or 4G, satellite, Bluetooth®, or the like.

The system 120 includes additional hardware and software typical of computing devices, e.g., power, cooling, operating system, though these components are not specifically shown in the figure for simplicity. In other implementations, different configurations of the device can be used, e.g., different bus or storage configurations or a multi-processor configuration.

While the arrangement has been described with respect to a computing device that is an animation workstation, it is to be understood that the arrangement may be implemented in any number of computing devices, including laptop computers, desktop computers, tablet computers, handheld computers, mobile phones, smart phones, and the like.

The examples above are illustrative and not limiting, and variations of the interactive system are possible as well. Accordingly, the technology is not limited to the specific examples discussed above, which are provided only as example forms of implementing the claims.

The invention claimed is:

1. A computer-based method of treating a character body animation to prevent potential pinches or tangles of cloth in a corresponding cloth animation using a processor, comprising:
   a. analyzing a character body animation using a processor, the analyzing including calculating the distance between at least one pair of predetermined body regions;
   b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh; and c. generating a cloth simulation based on the deformed mesh, wherein the calculating a distance includes calculating a distance between each of a plurality of mesh faces on one predetermined body region and each of a plurality of mesh faces on the other predetermined body region.

2. The method of claim 1, wherein the predetermined minimum distance varies with the pairs of predetermined body regions.

3. The method of claim 1, wherein the predetermined minimum distance is in a range of about 0.1 cm to 4 cm.

4. The method of claim 1, wherein a plurality of pairs of predetermined body regions are defined.

5. A computer-based method of treating a character body animation to prevent potential pinches or tangles of cloth in a corresponding cloth animation using a processor, comprising:

a. analyzing a character body animation using a processor, the analyzing including calculating the distance between at least one pair of predetermined body regions;

b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh, wherein a plurality of pairs of predetermined body regions are defined, and wherein the pairs of predetermined body regions are chosen from the group consisting of: arm and torso, right and left leg, head and shoulder, leg and hip, hand and body, and band of elbow or knee.

6. The method of claim 1, further comprising
generating a cloth simulation based on the deformed mesh.

7. A computer-based method of treating a character body animation to prevent potential pinches or tangles of cloth in a corresponding cloth animation using a processor, comprising:

a. analyzing a character body animation using a processor, the analyzing including calculating the distance between at least one pair of predetermined body regions;

b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh; and c. generating a cloth simulation based on the deformed mesh The method of claim 1, wherein the deforming includes moving one or more faces away from each other such that the distance between the faces equals or exceeds the predetermined minimum distance.

8. A computer-based method of treating a character body animation to prevent potential pinches or tangles of cloth in a corresponding cloth animation using a processor, comprising:

a. analyzing a character body animation using a processor, the analyzing including calculating the distance between at least one pair of predetermined body regions;

b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh, wherein the analyzing includes using a frame of one deformed mesh as a starting point for a generation of a succeeding frame.

9. The method of claim 1, wherein each of the pair of predetermined body regions is a respective set of mesh faces.

10. A computer-based method of treating a character body animation to prevent potential pinches or tangles of cloth in a corresponding cloth animation using a processor, comprising:

a. analyzing a character body animation using a processor, the analyzing including calculating the distance between at least one pair of predetermined body regions;

b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh; and c. generating a cloth simulation based on the deformed mesh, wherein a first frame analyzed in the analyzing step has no pairs of predetermined body regions that are separated by less than the predetermined minimum distance.

11. The method of claim 1, wherein the pair of predetermined body regions have no points in common.

12. A computer-based method of treating a character body animation to prevent potential pinches or tangles of cloth in a corresponding cloth animation using a processor, comprising:

a. analyzing a character body animation using a processor, the analyzing including calculating the distance between at least one pair of predetermined body regions;

b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh; and c. generating a cloth simulation based on the deformed mesh, wherein the deforming includes moving one or more faces away from each other such that the cumulative distance moved by all of the faces is minimized.

13. A computer-based method of treating a character body animation to prevent potential pinches or tangles of cloth in a corresponding cloth animation using a processor, comprising:

a. analyzing a character body animation using a processor, the analyzing including calculating the distance between at least one pair of predetermined body regions;

b. for each frame in the animation for which the predetermined body regions are less than a predetermined minimum distance apart, using the processor to deform at least one of the predetermined body regions such that the predetermined body regions are greater than or equal to the predetermined minimum distance apart, to form a deformed mesh; and c. generating a cloth simulation based on the deformed mesh, wherein the deforming includes moving one or more faces a distance based on a weighted average.

14. The method of claim 1, further comprising performing a smoothing step on the deformed mesh.

15. A non-transitory computer-readable medium, comprising instructions for causing a computing system to perform the method of claim 1.

16. A computing system, comprising:
   a. a processor;
   b. an input module running on the processor, the input module for creating or receiving a character body animation, or both;
   c. a pinch or tangled detection module running on the processor, the detection module for analyzing the character body animation and determining if any pairs of predetermined body regions in the character body animation may result in pinching or tangling;
   d. a character body animation deformation module running on the processor for creating a deformed character body mesh in the areas that may result in pinching or tangling, the deformed character body mesh having less areas that may result in pinching or tangling than in the input character body animation; and
   e. a cloth simulation module running on the processor for creating a cloth simulation based on the deformed character body mesh, the cloth simulation module at least for receiving the deformed mesh and for generating a non-pinched and non-tangled cloth mesh encompassing at least a portion of the deformed mesh.

17. The system of claim 16, wherein the detection module is configured to determine if any pairs of predetermined body regions may result in pinching or tangling by calculating one or more distances between the pairs of predetermined body regions and if any of the one or more distances are less than a predetermined minimum distance, then determining that the pair of predetermined body regions may result in pinching or tangling.

* * * * *